Aug. 2, 1955
G. R. SIMON
2,714,532
WHEEL CONSTRUCTION
Filed July 14, 1950
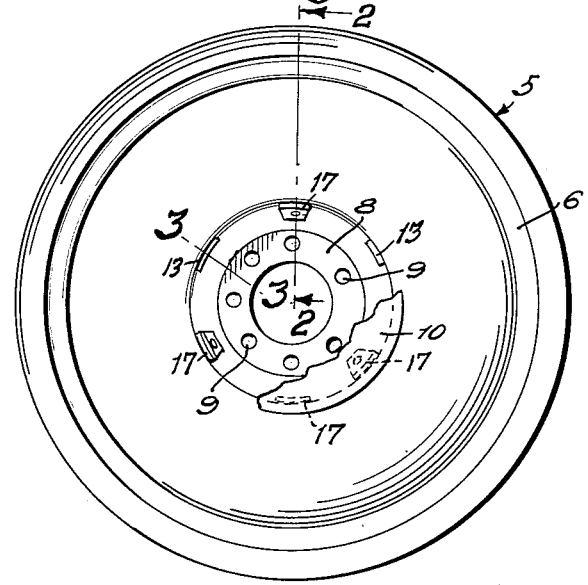
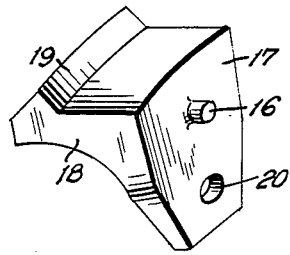
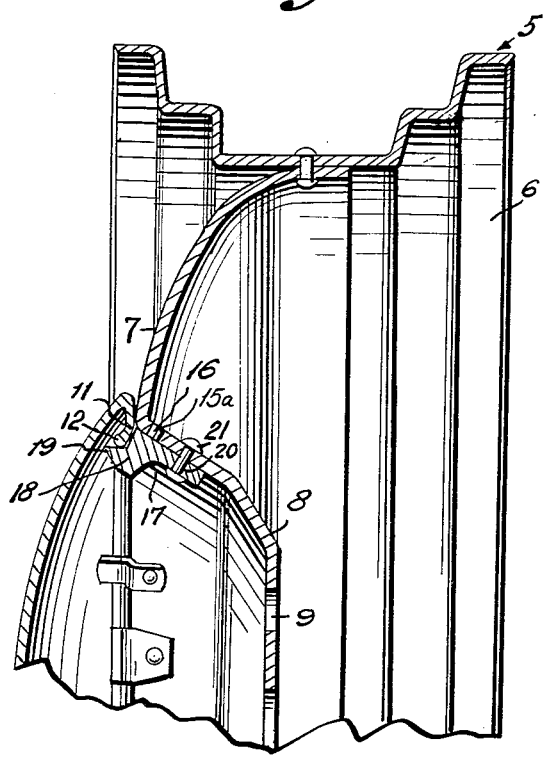
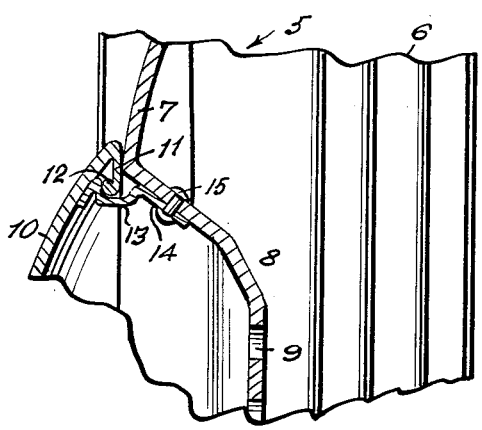
INVENTOR.
George R. Simon
BY Patrick D. Beavers
Attorney.

United States Patent Office 2,714,532
Patented Aug. 2, 1955

2,714,532

WHEEL CONSTRUCTION

George R. Simon, Seibert, Colo.

Application July 14, 1950, Serial No. 173,868

1 Claim. (Cl. 301—108)

The present invention relates to improvements in wheel constructions particularly adapted for automobiles.

The principal object of the present invention is to provide a wheel construction involving means for decreasing the likelihood of hub caps becoming displaced from the hub portions of automobile wheels, especially when the vehicle is passing over uneven ground.

Another important object of the invention is to provide a hub cap retaining structure for automobile wheels, which will not materially increase the cost of construction of wheel structures upon which this improved structure is located.

These and various other objects and advantges of the invention will become apparent to the reader of the following description.

In the drawing:

Figure 1 is a side elevational view of a wheel structure, showing the hub cap fragmentarily and the cap retaining lugs in addition to the usual spring detents.

Figure 2 is an enlarged fragmentary sectional view taken on line 2—2 of Figure 1.

Figure 3 is a fragmentary enlarged sectional view taken on line 3—3 of Figure 1.

Figure 4 is an enlarged perspective view of one of the retaining lugs.

Referring to the drawing wherein like numerals designate like parts, it can be seen that numeral 5 generally refers to a conventional automobile wheel, of which, there is a rim 6 and a wheel disk or wall 7. This particular type of wheel has an inset hub portion 8 formed with openings 9 through which the usual hub attaching stud bolts pass.

Numeral 10 denotes the hub cap of conventional form and this has an inwardly disposed flange 11 preferably with a bead 12 at its inner edge and under this engages the flexible finger portions 13 of spring members 14, these spring members being riveted or otherwise secured as at 15 to the flared portions of the inset 8.

Under normal traveling conditions, that is on level ground, the spring fingers 13 are sufficiently retentive to hold the cap 10 against displacement. However, in passing over rough surfaces, the vibration of the wheel in many instances causes displacement of the hub cap 10, with the result that the car owner must replace one or more hub caps yearly at the corresponding expense.

In carrying out the present invention, openings 15a in the flared portions of the inset 8 serve to receive bosses 16 on angularly formed blocks 17, these blocks including outstanding portions 18 on which are transverse shoulders 19. Each block has an opening 20 through which a rivet or other securing member 21 is disposed for positively securing the block in a definite position within the inset 8.

It will be observed that the shoulders 19 are parallel to the circumference of the rim and that the inturned flange 11 with its bead 12 barely slides over the same when the hub cap 10 is disposed into proper position. When the bead 12 is properly located over the shoulders 19, of course the spring fingers 13 will snap in place to prevent displacement of the cap 10.

In passing over rough terrain, there can be no differential movement of the wheel with respect to the cap 10, diametrically speaking, due to the flexibility of the spring fingers 13, which of course will yield under such conditions. The blocks 17 will prevent any such radial action between the cap and the disk or wall 7, thus placing no strain on the spring fingers 13.

The blocks 17 will not interfere with the ready displacement of the cap 10, as the flange 11 of the cap will readily pull over the shoulders 19 of the block 17.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

In an automobile wheel construction including a wheel wall, a hub cap having an inwardly protruding portion, and a plurality of spring fingers projecting from the wall in spaced circumferential relation to each other and engaging the inwardly protruding portion to retain the hub cap, the provision of a plurality of blocks attached to said wheel wall in spaced circumferential relation to each other and each is equidistant circumferential relation to an adjacent pair of spring fingers, said blocks each having a shoulder at its outer end concentric with the circumference of said wheel, said shoulders being adapted to engage the inwardly protruding portion of said hub cap.

References Cited in the file of this patent

UNITED STATES PATENTS

| 203,204 | Shepard | Apr. 30, 1878 |
| 2,133,142 | Horn | Oct. 11, 1938 |
| 2,217,116 | Hunt et al. | Oct. 8, 1940 |
| 2,339,744 | Spencer | Jan. 18, 1944 |
| 2,405,586 | Lyon | Aug. 13, 1946 |
| 2,541,079 | Lyon | Feb. 13, 1951 |
| 2,544,702 | Lyon | Mar. 13, 1951 |